United States Patent

[11] 3,618,098

[72] Inventor Hilary H. Nall
  Silver Spring, Md.
[21] Appl. No. 333,230
[22] Filed Dec. 24, 1963
[45] Patented Nov. 2, 1971
[73] Assignee The United States of America as represented by the Secretary of the Navy

[54] WIDE BAND DELAY LINE
  8 Claims, 3 Drawing Figs.
[52] U.S. Cl. .................................................. 343/100 CL,
  235/181, 343/15, 343/112 R
[51] Int. Cl. ................................................ G01s 9/04
[50] Field of Search .......................................... 343/100.7,
  15; 235/181

[56] References Cited
  UNITED STATES PATENTS
  3,154,778 10/1964 Kock ........................ 235/181 X
  3,212,091 10/1965 Bissett et al. .................. 343/112
  OTHER REFERENCES
  I.R.E. Dictionary of Electronic Terms and Symbols, 1961, page 116. TK 7804 IS. copy in Group Primary Examiner—Rodney D. Bennett, Jr.
Assistant Examiner—Richard E. Berger
Attorneys—J. P. Dunlavey and J. O. Tresansky ABSTRACT: A triangulation-correlation system having an improved correlator using a wide range variable delay line and a multiplier capable of multiplying the wise band signals together.

PATENTED NOV 2 1971  3,618,098

HILARY H. NALL
INVENTOR.

BY
Claude Funkhouser
ATTORNEY

WIDE BAND DELAY LINE

The present invention relates in general to passive target locating systems and more particularly to a signal correlator for use in a ghost-free triangulation-correlation (Tricor) system.

Several methods of target location have been proposed to date. In the well-known triangulation method, targets are located passively by pointing two radar receivers at the target from different locations. Knowing the distance between the radar receivers and the angle which they are pointing, the target is located at the intersection of the two beams. The resolution of this system is limited by the antenna patterns of the two radar receivers and is hopelessly confused by ghosts when more than one target is involved.

The triangulation-correlation system was proposed to solve the ghost problem presented in the earlier system. This system solves the ghost problem of triangulation by the introduction of target resolution in path length difference as well as angle. The time delay between reception of a signal at the master station along a direct path from the target and the reception of the signal along a second path through a repeater station defines a hyperboloid of revolution on which the target is located. The intersection of one radar receiver pointing angle with this hyperboloid locates the target. The time delay itself is measured by correlation of signals received along the two paths after the signal from the shorter path has been delayed locally the proper amount.

It is a principal object of the instant invention to provide means for correlating the signals in a passive target locating system of the triangulation-correlation type.

Another object of the invention is the provision of a correlator of the type described having a variable delay line and a frequency multiplier.

These and other objects and many of the attendant advantages of this invention will be readily appreciated as the same becomes better understood by reference to following detailed description when considered in connection with the accompanying drawings, wherein.

The present invention is designed for use with an advanced ghost-free version of a triangulation-correlation target locating system known as Tricor. This system was designed to operate in conjunction with frequency diversity radar systems to detect and locate wide-band noise from a barrage jammer which might be used against such radars.

There are two important components of a correlator which are influenced by the wide bandwidth requirement of the system. These are (1) a delay line variable in length over the possible ranges to be expected with minimum increments of delay no greater than the resolution of the system, and (2) a multiplier capable of multiplying the wide-band signals together.

Figure 1:
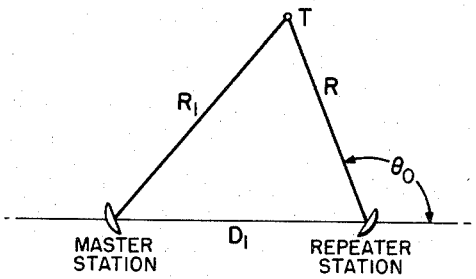
FIG. 1 is a diagram of the detection system according to the invention.

FIG. 1 shows a diagram of the antenna receiving system. The range of values of delay required from the delay line can be calculated as follows:

$$d = (1/C)(R + D_1 - R_1)$$

where $C$ is the velocity of propagation of microwave energy in air. From this representation for the delay it is seen that for $\theta$ near $0°$, $d \cong 1/C\,(2D_1)$, and for $\theta$ near $180°$, $d \cong 0$.

The delay line should be variable in length, then, over a range from near zero microseconds to $1/C(2D_1)$ microseconds. For a $D1$ of 10 miles, the maximum delay required would be nearly 120 microseconds or 120,000 feet. For a 50-megacycle bandwidth system, the smallest increment of delay should be no greater than 0.02 microseconds or 20 feet. These requirements are well beyond the state of the art of conventional delay lines which depend on propagation time through a certain distance in a given medium. However, for noise correlation systems, it is possible to achieve the desired delay line characteristics.

According to the invention the desired delay is achieved by sampling the noise and then storing the samples a desired length of time before they are used. This technique can be used with Gaussian noise with no loss in information since a sampled Gaussian function is still Gaussian. What is lost in a sampled system over a continuous system is time.

Figure 2:
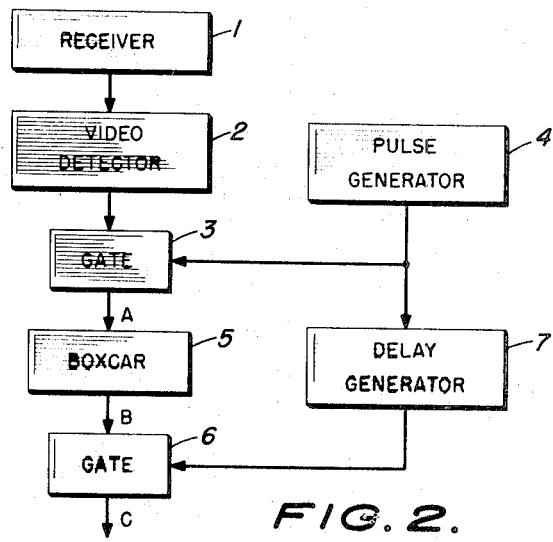
FIG. 2 is a block diagram of a delay device as used in the invention.

Referring to FIG. 2, there is illustrated a delay device according to the invention. Wide-band microwave noise is received by a receiver 1 and passed on to a video detector 2. The output of video detector 2 is connected to a gate 3 which is controlled by a pulse generator 4. The output of the gate 3 controls a boxcar 5 which applies its output to a second gate 6. Both of the gates 3 and 6 respond to signals from the pulse generator 4, however, the signals to the gate 6 first pass through a delay generator 7. The output of the gate 6 is a pulse identical to the pulse out of the gate 3 except that it is delayed in time. The delay is set by the delay generator 7. Conventional pulse delay generators are available which can produce variable delays ranging from zero to thousands of microseconds.

Figure 3:
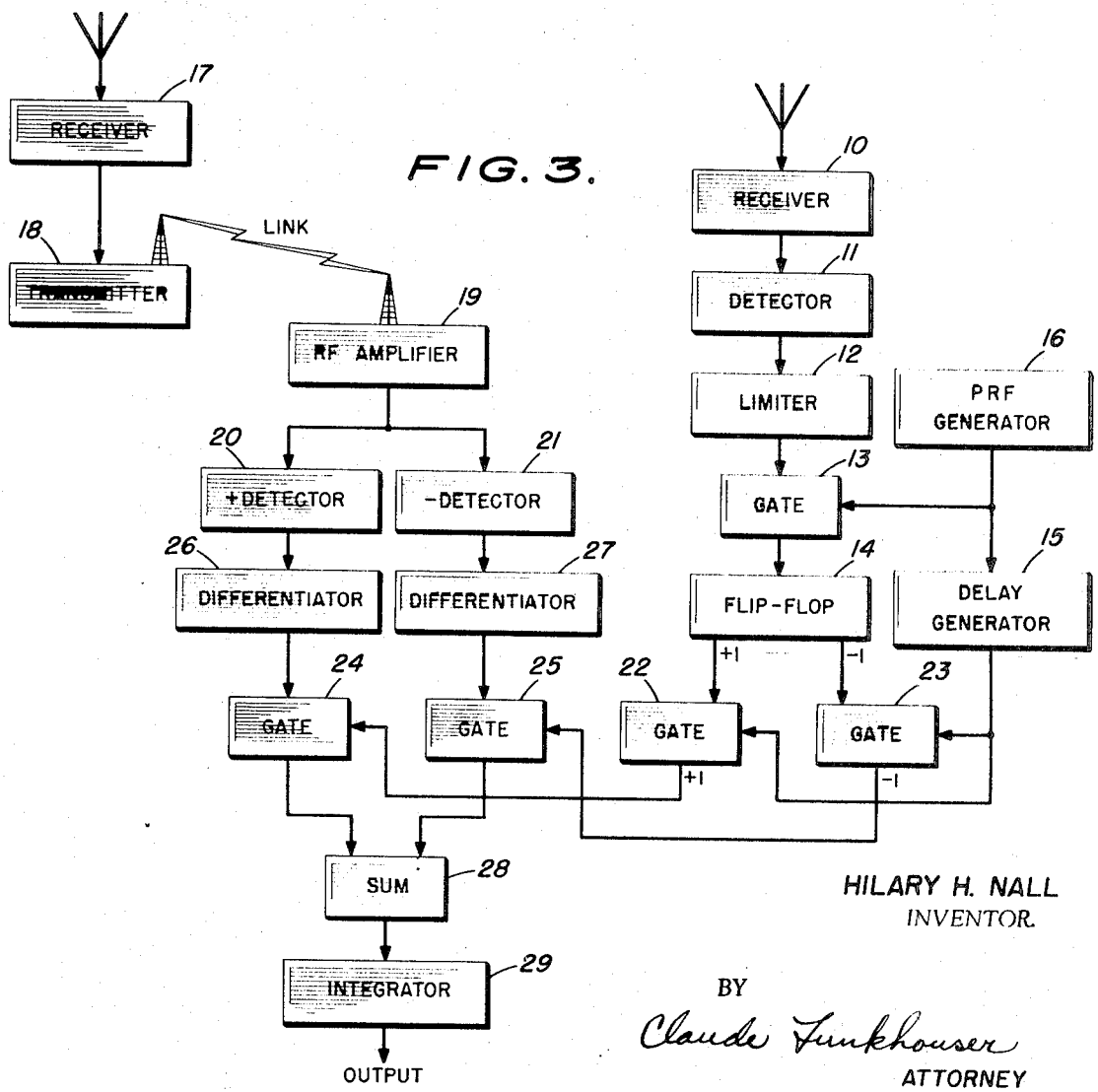
FIG. 3 is a block diagram of the novel correlator according to the invention.

The complete correlator according to the invention is shown in FIG. 3. A signal from a target station T is picked by the receiver 10 of the master station and is successively applied to a detector 11 and a limiter 12. The signal is then sampled by a 0.02-microsecond gate 13 and stored in a flip-flop 14. The flip-flop 14 has parallel outputs with zero volts on the unexcited leg and suitable positive voltage on the excited leg. After a time set by a time delay generator 15, a 0.02 microsecond pulse is produced on the flip-flop leg which is excited. This pulse gates a sample of the signal from a repeater station 17, 18 after it has been detected and differentiated. Both the gate 13 and the delay generator 15 operate in response to pulses from the timing generator 16.

The repeater station picks up its signal at a receiver 17 and relays it to the master station via a transmitter 18 where it is received and amplified by an RF amplifier 19. The signal is then applied to a +detector 20 and a −detector 21. The delayed signal in the master station is limited by a hard limiter 12 to two possible values which can be normalized to +1 and −1. The multiplication process then reduces to multiplying the undelayed signal by +1 or −1. Multiplication by +1 is accomplished by gating the output of the +detector 20 and multiplication by −1 is accomplished by gating the output of the −detector 21.

The output of the flip-flop 14 is applied to a pair of gates 22 and 23 which are controlled by the delay generator 15. The gates 22 and 23, in turn, control a second pair of gates 24 and 25, respectively, in the output of the detectors 20 and 21. The output of the detectors 20 and 21 is applied to a pair of differentiators 26 and 27, respectively, and then passed through the gates 24 and 25 to a summing circuit 28. The output of the summing circuit is integrated in a wave shaper 29 and is then passed from the correlator to suitable display apparatus (not shown).

Obviously, many modifications and variations of the present invention are possible in the light of the above teachings. It is therefore to be understood that within the scope of the appended claims the invention may be practiced otherwise than as specifically described.

What is claimed is:

1. A correlator for a passive target locating system, comprising, a first receiver for receiving a first group of reflected radio signals from said target, a second receiver for receiving a second delayed target, of radio signals from said target.

a limiter operably connected to receive as input the signals received by said first receiver storage means, means for gating the output of the limiter at timed intervals into said storage means, said means releasing the output from said storage means after a predetermined delay, and means for providing output signals indicative of coincidence between output signals from said storage means and output signals from said second receiver.

2. A correlator as recited in claim 1, wherein said storage means includes a flip-flop.

3. In a correlator for a passive target locating system, a delay apparatus including
- a receiver,
- a video detector connected with the receiver,
- a gate connected to the video detector,
- a pulse generator connected to the gate,
- said pulse generator controlling said gate,
- a second gate,
- a boxcar connected between the first and second gates, and
- a delay generator connected to the pulse generator and between the gates,
- said delay generator delaying in time an output pulse from the second gate.

4. In a passive target locating system including a master station, a target station, and a repeater station, a correlator including
- a receiver for picking up a signal from the target station,
- a detector connected to the receiver,
- a limiter connected to the detector,
- a gate connected to the limiter for sampling the signal from the limiter,
- signal storage means connected with the gate,
- said storage means having parallel outputs,
- a gate connected to each of said outputs,
- means for receiving a signal from the repeater station, said repeater station comprising a transponder,
- means at the master station for amplifying the signal from the transponder,
- detecting means connected to said last-mentioned means,
- differentiating means connected to said detecting means,
- gating means connected to the differentiating means,
- said gating means being connected to said storage means output gates,
- summing means connected to the outputs of said gating means and the storage means output gates, and
- integrating means connected to said summing means.

5. A passive target locating system as recited in claim 4, wherein said signal storage means consists of a flip-flop.

6. A passive target locating system as recited in claim 4, wherein said signal storage means consists of a flip-flop, and including a delay generator and a timing generator connected to the first mentioned gate.

7. A correlator for a passive target locating system, including
- a first receiver for receiving a first group of radio signals from said target,
- a second receiver for receiving a second delayed group of radio signals from said target,
- detector means connected to said first receiver for detecting output signals therefrom,
- storage means having an input adapted to be operably connected to said detector means to receive said detected signals from said first receiver;
- gating means operably connected between the input of said storage means and said detector means for gating input signals into said storage means from said detector means at timed intervals, and connected to the output of said storage means for releasing output signals therefrom after a predetermined delay, and
- means for providing output signals indicative of coincidence between output signals from said storage means and output signals from said second receiver.

8. The invention as recited in claim 7, wherein said storage means comprises a boxcar.

* * * * *